(12) United States Patent
Santos Soto

(10) Patent No.: US 10,717,548 B2
(45) Date of Patent: Jul. 21, 2020

(54) DEPLOYABLE MULTI-SECTION BOOM

(71) Applicant: United States of America as represented by the Administrator of NASA, Washington, DC (US)

(72) Inventor: Luis H. Santos Soto, Odenton, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 476 days.

(21) Appl. No.: 15/713,747

(22) Filed: Sep. 25, 2017

(65) Prior Publication Data

US 2019/0092496 A1    Mar. 28, 2019

(51) Int. Cl.
*B64G 1/22* (2006.01)
*B25J 18/00* (2006.01)
(Continued)

(52) U.S. Cl.
CPC .............. *B64G 1/222* (2013.01); *B25J 18/00* (2013.01); *B25J 17/0241* (2013.01); *B25J 18/002* (2013.01); *B64G 2004/005* (2013.01)

(58) Field of Classification Search
CPC ..................................................... B64G 1/222
See application file for complete search history.

(56) References Cited

U.S. PATENT DOCUMENTS

| | | | |
|---|---|---|---|
| 4,772,175 A * | 9/1988 | Grimaldi | B25J 5/02 |
| | | | 182/103 |
| 5,319,905 A * | 6/1994 | Szirtes | B64G 1/443 |
| | | | 136/245 |

(Continued)

*Primary Examiner* — Philip J Bonzell
*Assistant Examiner* — Michael B. Kreiner
(74) *Attorney, Agent, or Firm* — Matthew F. Johnston; Bryan A. Geurts; Helen M. Galus

(57) ABSTRACT

A deployable multi-section boom comprising a first hinge assembly including a base section adapted to be attached to a structure, a movable section that is pivotably attached to the base section and a first boom attached to the movable section. The first hinge assembly is configured to allow the first boom to pivot in a first direction to a first predetermined maximum angle with respect to the base section. A first constant torque assembly constantly urges the first boom to pivot in the first direction and includes a component attached to the base section of the first hinge assembly. The multi-section boom includes a second hinge assembly that includes a first section attached to the first boom and a second section that is pivotably attached to the first section. A second boom is attached to the second section of the second hinge assembly wherein the second hinge assembly allows the second boom to pivot in a second direction to a second predetermined maximum angle with respect to the first boom. A second constant torque assembly constantly urges the second boom to pivot in the second direction and includes a component that is attached to the first section of the second hinge assembly. The first constant torque assembly and second constant torque assembly cooperate to configure the multi-section boom in a fully deployed state wherein the constant torque applied to the first boom causes the entire multi-section boom to pivot in the first direction while the constant torque applied to the second boom causes the second boom to simultaneously pivot in the second direction with respect to the first boom while the entire multi-section boom continues to pivot in the first direction. The multi-section boom is fully deployed when the first boom pivots to the first predetermined maximum angle and the second boom pivots to the second predetermined angle.

30 Claims, 14 Drawing Sheets

(51) Int. Cl.
*B25J 17/02* (2006.01)
*B64G 4/00* (2006.01)

(56) References Cited

U.S. PATENT DOCUMENTS

| | | | | |
|---|---|---|---|---|
| 5,546,632 A * | 8/1996 | Robinson | ............... | B64G 1/22 |
| | | | | 16/277 |
| 5,716,030 A * | 2/1998 | LaFiandra | ............... | B64G 1/222 |
| | | | | 244/129.4 |
| 5,720,452 A * | 2/1998 | Mutschler, Jr. | ............... | B64G 1/222 |
| | | | | 244/172.7 |
| 6,637,702 B1 * | 10/2003 | McCandless | ............... | B64G 1/222 |
| | | | | 244/172.6 |
| 7,278,612 B1 * | 10/2007 | Munder | ............... | B64G 1/222 |
| | | | | 244/172.6 |
| 8,496,209 B2 * | 7/2013 | Chaix | ............... | B64G 1/222 |
| | | | | 244/172.6 |
| 2017/0174366 A1 * | 6/2017 | Blanc | ............... | B64G 1/222 |

* cited by examiner

DEPLOYABLE MULTI-SECTION BOOM

ORIGIN OF INVENTION

The invention described herein was made by an employee of the United States Government, and may be manufactured and used by or for the Government for governmental purposes without the payment of any royalties thereon or therefor.

CROSS REFERENCE TO OTHER PATENT APPLICATIONS

None.

FIELD OF THE INVENTION

The present invention relates to a deployable multi-section boom.

BACKGROUND

Deployable booms are typically used with spacecraft such as satellites for the purpose of deploying instruments and sensors that collect certain types of scientific data. It is very common to have one or more booms extending from a satellite wherein each boom carries a specific instrument or sensor, e.g. magnetometer. It is important that the distance between the spacecraft and the instruments and/or sensors be sufficient to prevent interference with the operation of the instruments and/or sensors from electrical, magnetic and/or nuclear radiation emanating from the satellite. Thus, the maximum length of a fully deployed boom is a critical factor in obtaining undistorted scientific data from instrumentation or sensors. It is also a requirement that a deployable boom be compact enough to be stowed within a small volume within the spacecraft but yet be robust enough to withstand high launch loads. Furthermore, the deployable boom must be capable of deploying from a stowed state to a stable, elongated, rigid structure without losing any structural integrity during deployment. Therefore, what is needed is a new and improved deployable boom having a structure that not only has the aforementioned desired characteristics but is also lightweight, uses relatively fewer components when compared to conventional deployable booms and is relatively inexpensive to manufacture.

SUMMARY OF THE INVENTION

In one aspect, the present invention is directed to a deployable multi-section boom. In an exemplary embodiment, the deployable multi-section boom of the present invention includes a first hinge assembly that includes a base section adapted to be attached to a structure, such as a spacecraft, and a movable section that is pivotably attached to the base section. The multi-section boom includes a first or lower boom attached to the movable section of the first hinge assembly. The first hinge assembly is configured to allow the first boom to pivot in a first direction to a first predetermined maximum angle with respect to the base section. The multi-section boom further includes a first constant torque assembly to constantly urge the first boom to pivot in the first direction. The first constant torque assembly includes a component attached to the base section of the first hinge assembly. The multi-section boom further includes a second hinge assembly that includes a first section attached to the first boom and a second section that is pivotably attached to the first section. The multi-section boom further includes a second or upper boom that has a first end that is attached to the second section of the second hinge assembly. The second hinge assembly is configured to allow the second boom to pivot in a second direction to a second predetermined maximum angle with respect to the first boom. The multi-section boom further includes a second constant torque assembly that constantly urges the second boom to pivot in the second direction. The second constant torque assembly includes a component that is attached to the first section of the second hinge assembly. The first constant torque assembly and second constant torque assembly cooperate to configure the multi-section boom to a fully deployed state wherein the constant torque applied to the first boom causes the entire multi-section boom to pivot in the first direction while the constant torque applied to the second boom causes the second boom to simultaneously pivot in the second direction while the entire multi-section boom continues to pivot in the first direction. The multi-section boom is fully deployed when the first boom pivots to the first predetermined maximum angle and the second boom pivots to the second predetermined angle.

In another aspect, the present invention relates to a spacecraft comprising a spacecraft body and a deployable multi-section boom movable attached to the spacecraft body and configurable to a fully deployed state from an initial stowed state. In an exemplary embodiment, the deployable multi-section boom includes a first hinge assembly having a base section attached to the spacecraft body and a movable section that is pivotably attached to the base section. The multi-section boom further includes a first or lower boom attached to the movable section of the first hinge assembly. The first hinge assembly is configured to allow the first boom to pivot in a first direction to a first predetermined maximum angle with respect to the base section. The multi-section boom further comprises a first constant torque assembly to constantly urge the first boom to pivot in the first direction. The first constant torque assembly includes a component attached to the base section of the first hinge assembly. The multi-section boom further includes a second hinge assembly having a first section attached to the first boom and a second section that is pivotably attached to the first section. A second or upper boom is attached to the second section of the second hinge assembly. The second hinge assembly is configured to allow the second boom to pivot in a second direction to a second predetermined maximum angle with respect to the first boom. The multi-section boom further includes a second constant torque assembly to constantly urge the second boom to pivot in the second direction. The second constant torque assembly includes a component that is attached to the first section of the second hinge assembly. The spacecraft body includes a release mechanism having a release plate releasably attached thereto. The release mechanism is configurable to a first state wherein the release plate is retained by the release mechanism and to a second state wherein the release plate is released by the release mechanism. The second boom is configured to engage the release plate. When the multi-section boom is initially in the stowed configuration, the release mechanism is in the first state and the second boom is in juxtaposition with the first boom such that the release plate is engaged with the second boom. The spacecraft body includes a lip for engaging an extending portion of the second boom in order to maintain the multi-section boom in the stowed state. When the release mechanism is configured to the second state, the release plate is released thereby allowing the torque created by the second constant torque assembly to cause the second boom to pivot in the second direction so that the extending portion of the second boom becomes free of the lip. When the extending portion of the second boom is completely free of the lip, the torque created by the first constant torque assembly causes the first boom, and thus the entire multi-section boom, to pivot in the first direction while the second boom simultaneously pivots in the second direction with respect to the first boom. The multi-section boom is fully deployed when the first boom pivots to the first predetermined maximum angle and the second boom pivots to the second predetermined maximum angle with respect to the first boom.

Other aspects and advantages of the invention will become apparent from the following detailed description taken in conjunction with the accompanying drawings which illustrate, by way of example, the principles of the described embodiments.

DESCRIPTION OF EXEMPLARY EMBODIMENTS

As used herein, the term "structure" refers to the physical structure, or portion thereof, of an object or body including spacecraft, machine or machinery, robots, automobiles, trucks and other road vehicles, remote-controlled vehicles, drones, unmanned aerial vehicles (UAV), airplanes, ships, submarines, underwater drones and trains.

As used herein, the term "spacecraft" refers to any type of spacecraft used in space or space applications and includes satellites, CubeSats, space stations, capsules, rockets, probes, pods, planetary rovers and other space exploration vehicles.

Figure 1:
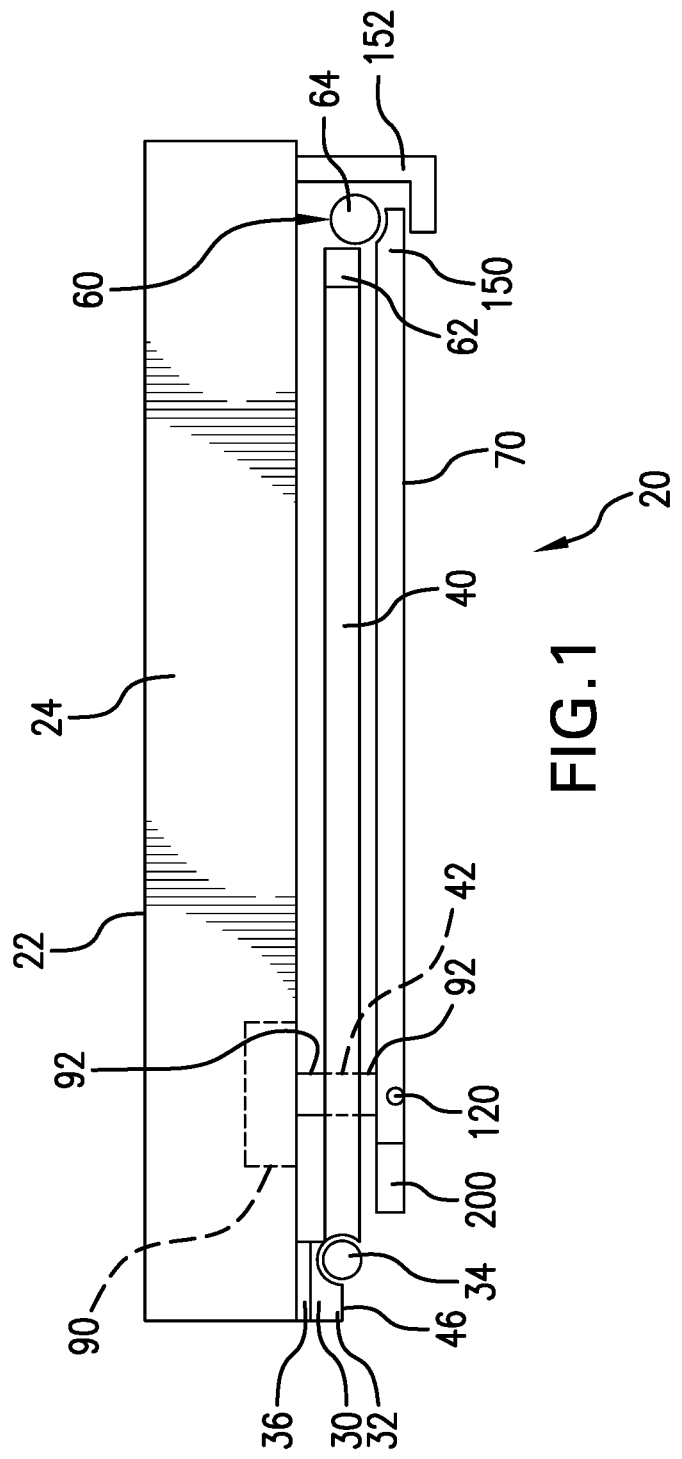
FIG. 1 is a side elevational of a deployable multi-section boom in accordance with an exemplary embodiment of the invention, the deployable multi-section boom being movably attached to a structure, such as a spacecraft body, and configured in a stowed state.
Figure 2:
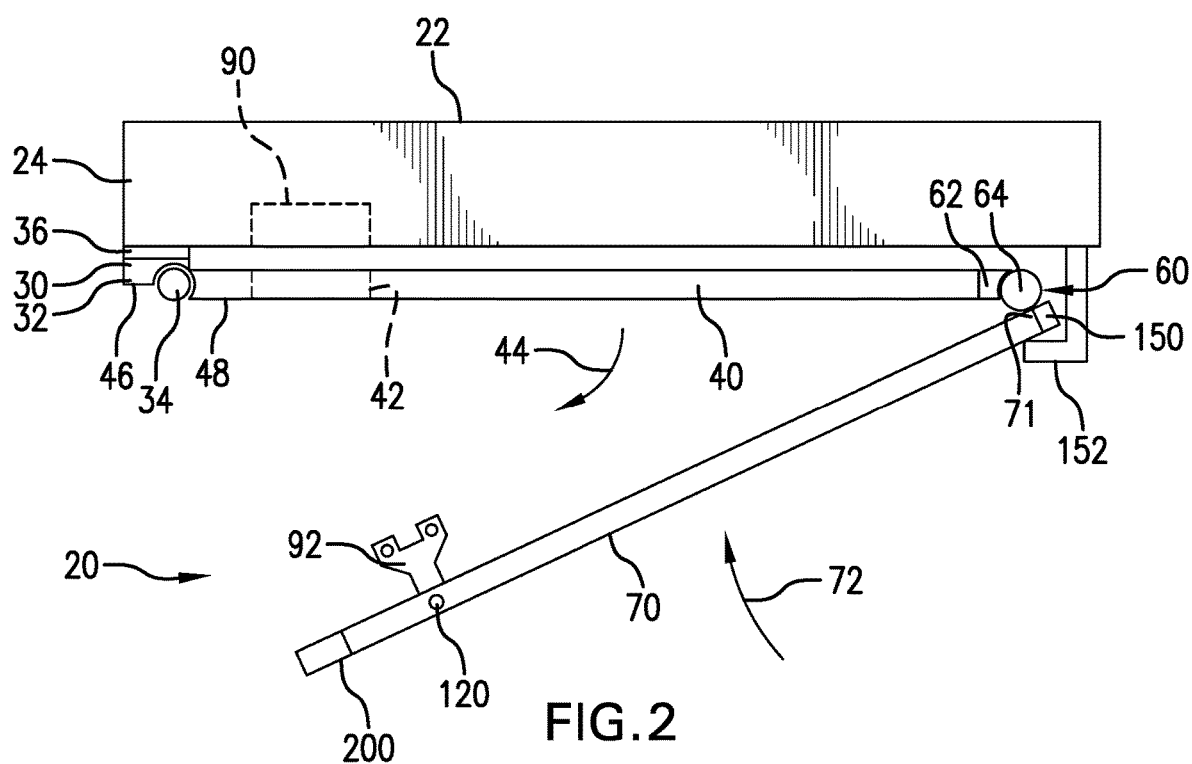
FIG. 2 is a side elevational view of the deployable multi-section boom wherein an upper boom of the deployable multi-section boom is released from the spacecraft body so as to allow the upper boom to pivot away from a lower boom of the deployable multi-section boom.
Figure 3:
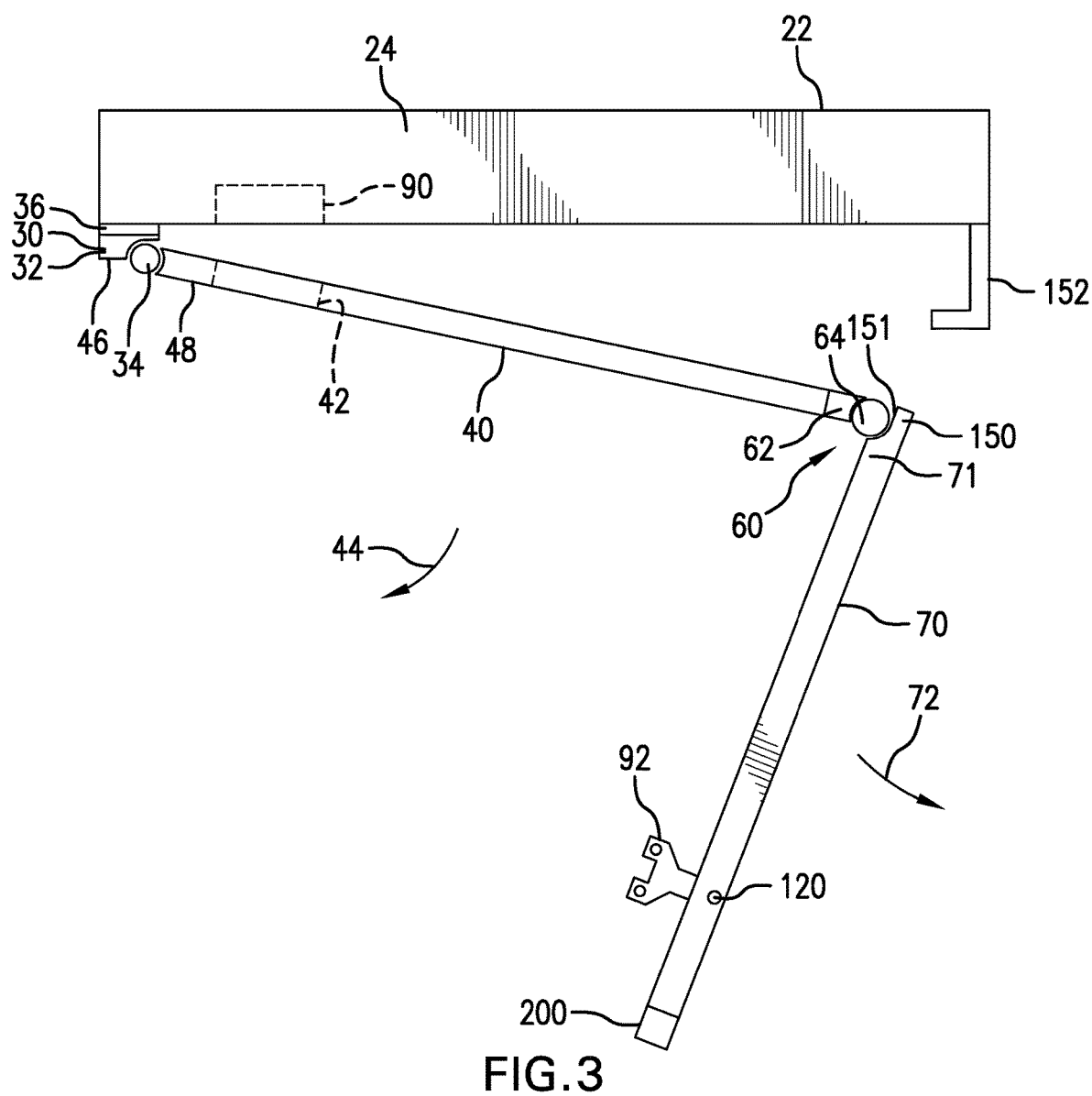
FIG. 3 is a side elevational view of the deployable multi-section boom wherein the upper boom has pivoted a distance sufficient to allow the deployable multi-section boom to become free of a lip that is attached to the spacecraft body.
Figure 4:
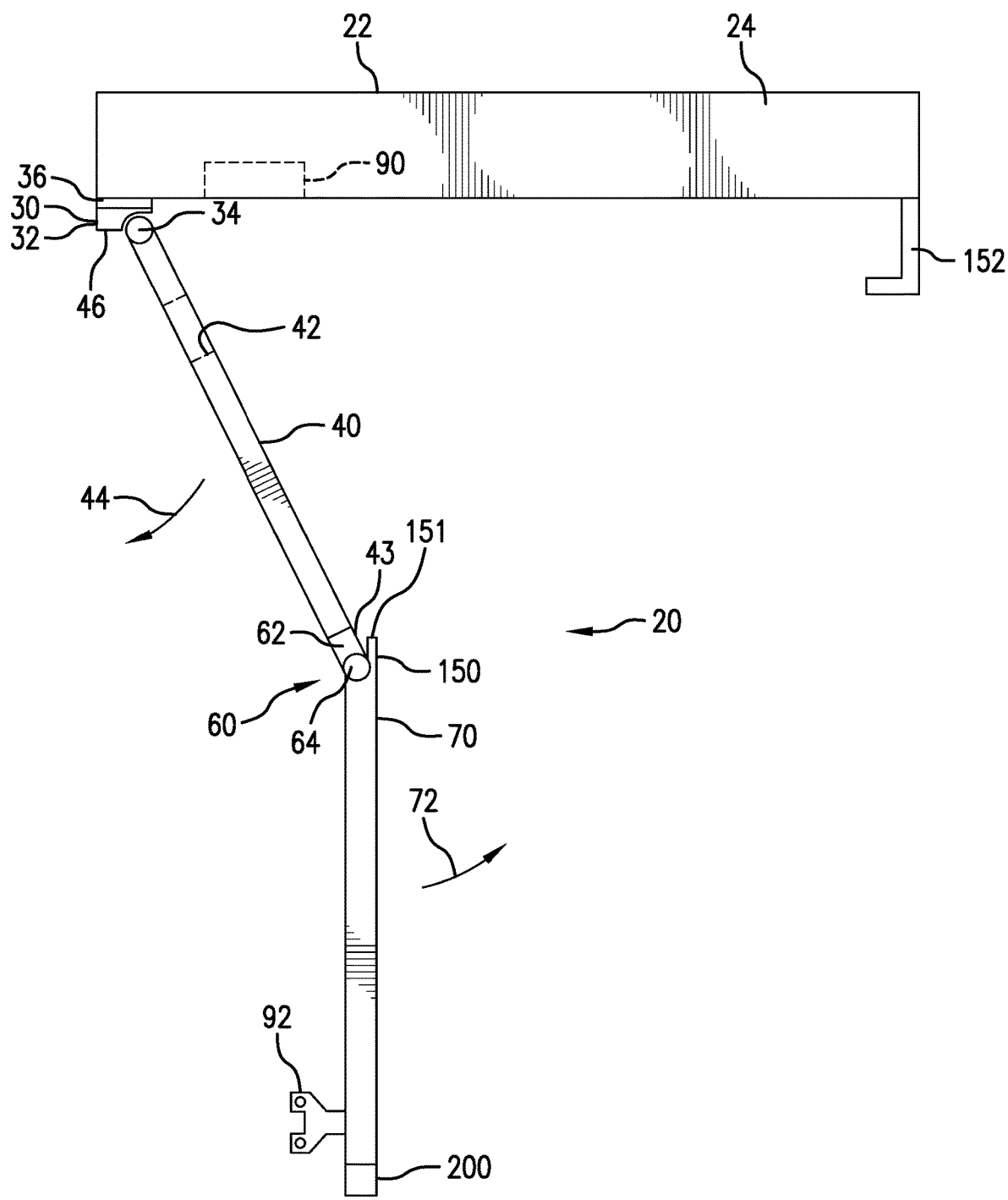
FIG. 4 is a side elevational view showing the entire deployable multi-section boom pivoting in a first direction while the upper boom simultaneously pivots in an opposite second direction with respect to the lower boom.
Figure 5:
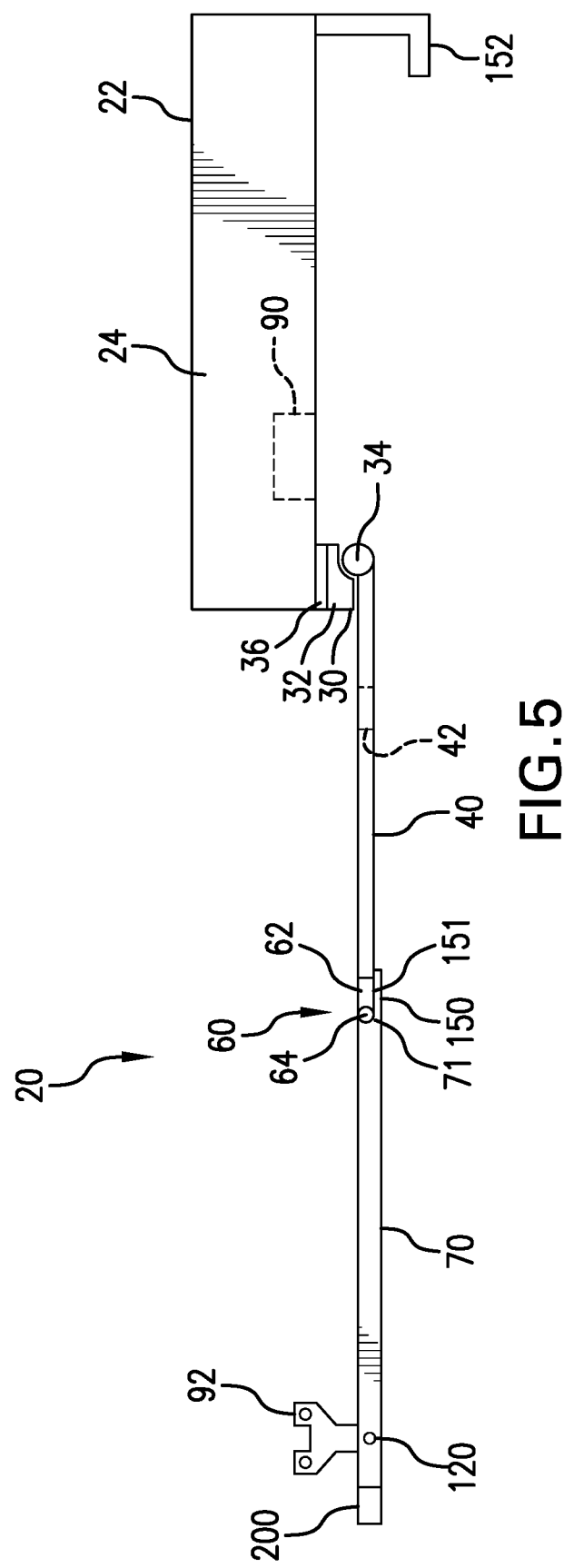
FIG. 5 is a side elevational view showing the multi-section boom in a fully deployed state.
Figure 6:
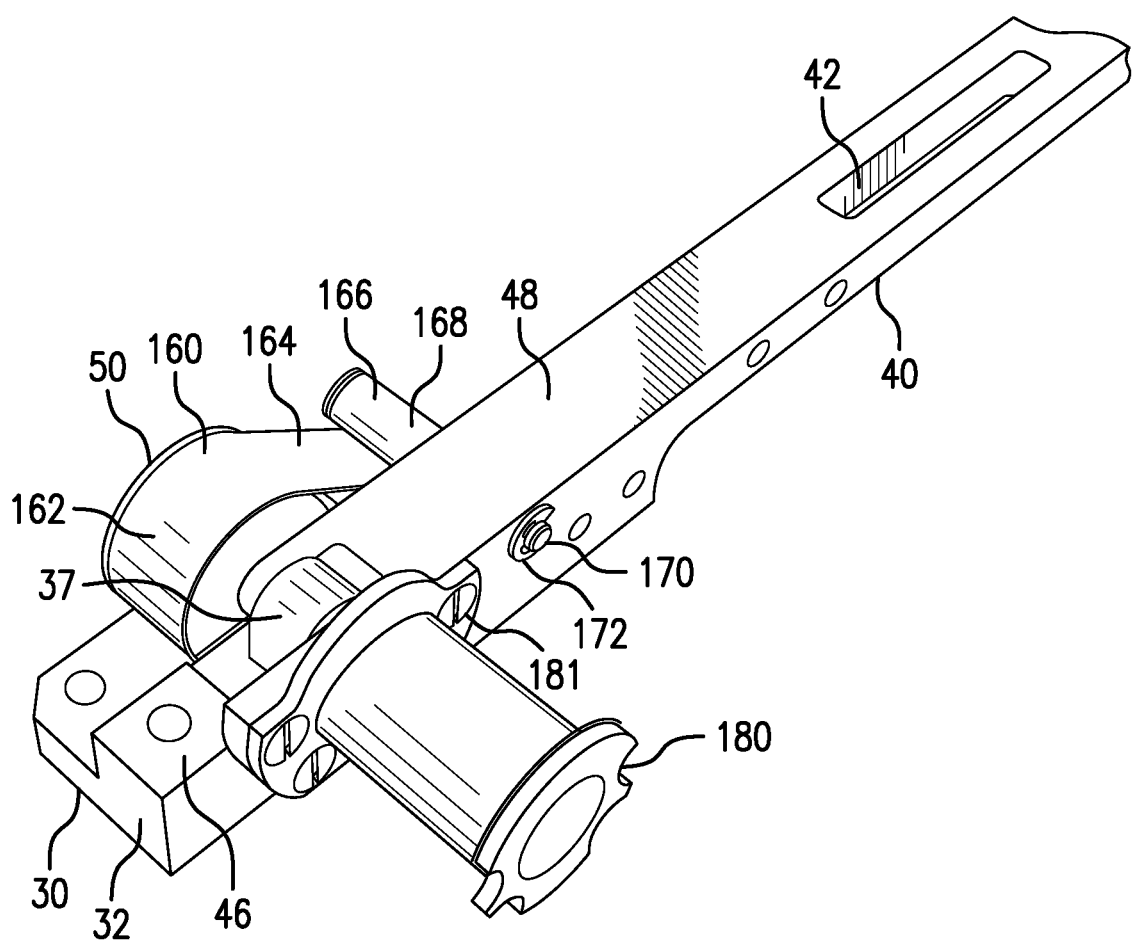
FIG. 6 is a perspective view of a portion of the deployable multi-section boom, the view showing a first hinge assembly and a first constant torque assembly.

The concept and operation of deployable multi-section boom 20 of the present invention are illustrated in FIGS. 1-5. The views of the deployable multi-section boom 20 shown in FIGS. 1-5 are simplified in order to facilitate understanding of the basic concept of the invention. Therefore, several components of deployable multi-section boom 20 are not shown in FIGS. 1-5 but are shown in detail in other drawings herein. Deployable multi-section boom 20 of the present invention is used with structure 22. In an exemplary embodiment, structure 22 comprises a spacecraft which includes spacecraft body 24. Multi-section boom 20 is movably attached to spacecraft body 24 and configurable to a fully deployed state from an initial stowed state. In an exemplary embodiment, deployable multi-section boom includes first hinge assembly 30 which has base section 32 adapted to be attached to spacecraft body 24 and movable section 34 that is pivotably attached to base section 32. In a preferred embodiment, isolator 36 is positioned between base section 32 and spacecraft body 24. Isolator 36 electrically isolates multi-section boom 20 from spacecraft body 24 because spacecraft body 24 is part of the spacecraft's electrical ground system. Hence, isolator 36 minimizes or eliminates any electrical current flowing into multi-section boom 20 thereby minimizing or eliminating magnetic fields on multi-section boom 20. In an exemplary embodiment, movable section 34 comprises a hinge shaft. First hinge assembly 30 further includes portion 37 that functions as the hinge knuckle (see FIG. 6). Hinge shaft 34 passes through hinge knuckle 37. Multi-section boom 20 further includes a first or lower boom 40 that is attached to the movable section 34 of first hinge assembly 30. First boom 40 has slot 42 therein that extends there-through as shown in FIG. 6. First hinge assembly 30 is configured to allow first boom 40 to pivot in a first direction indicated by arrow 44 to a first predetermined maximum angle with respect to base section 32 as shown in FIGS. 2-4. Base section 32 includes raised stop-structure 46 that is shaped to limit or stop the pivotal movement of first boom 40 at the first predetermined maximum angle. Thus, when first boom 40 is pivoted in the first direction 44 to the first predetermined maximum angle, portion 48 of first boom 40 physically contacts raised stop structure 46 (see FIGS. 2, 3 and 5). The specific size, shape and structure of raised stop-structure 46 and/or portion 48 are configured to provide a first predetermined maximum angle of about 180°. It is to be understood that raised stop-structure 46 and/or portion 48 may be configured to have different sizes and/or structures so as to provide a first predetermined maximum angle other than 180°. Referring to FIG. 6, multi-section boom 20 further comprises a first constant torque assembly for constantly urging first boom 40 to pivot in the first direction 44. The first constant torque assembly includes component 50 that is attached to base section 32 of first hinge assembly 30. The first constant torque assembly is discussed in detail in the ensuing description.

Figure 7:
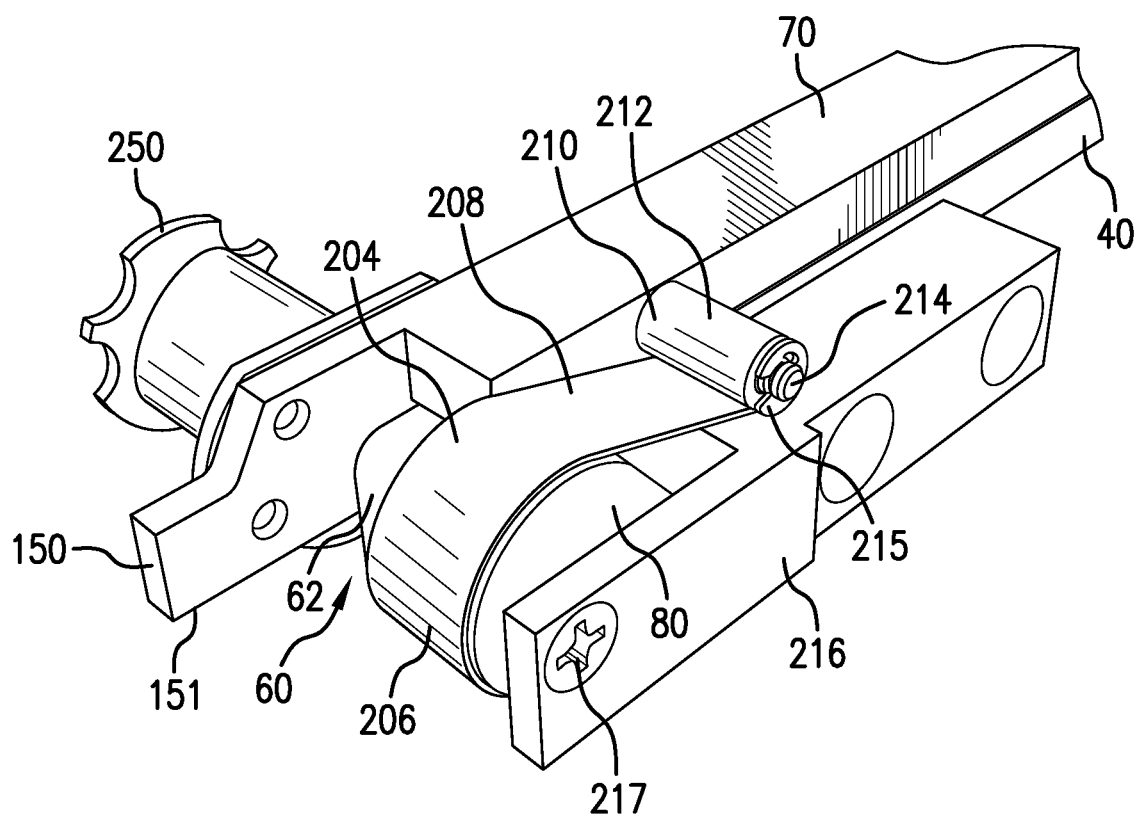
FIG. 7 is a perspective view of another portion of the deployable multi-section boom while in the stowed state, the view showing a second hinge assembly and a second constant torque assembly operable with the upper boom.

Referring to FIGS. 1-5 and 7, multi-section boom 20 further includes a second hinge assembly, indicated by reference number 60, which includes first section 62 that is attached to first boom 40 and second section 64 that is pivotably or movably attached to first section 62. Multi-section boom 20 further includes a second or upper boom 70. Second boom 70 has first end portion 71 that is attached to second section 64 of second hinge assembly 60. End portion 71 includes an extending portion 150. Extending portion 150 includes edge portion 151. Second hinge device 60 is configured to allow second boom 70 to pivot in a second direction 72 with respect to first boom 40 to a second predetermined maximum angle. In an exemplary embodiment, second section 64 of second hinge device 60 comprises a hinge shaft. First section 62 functions as a hinge knuckle and receives hinge shaft 64. First section 62 may be integral with first boom 40 or may be a separate structure that is attached or fixed to first boom 40. Referring to FIG. 7, portion 151 of extending portion 150 physically contacts the surface 43 of first boom 40 when second boom 70 has pivoted in the second direction 72 to the second predetermined maximum angle. The shape, size and structure of portion 151 and/or surface 43 are configured to provide a desired second predetermined maximum angle. Thus, in an exemplary embodiment, the shape, size and structure of portion 151 and/or surface 43 are configured to provide a second predetermined maximum angle of 180°. However, it is to be understood that the shape, size and structure of portion 151 and/or surface 43 may be configured to achieve a second predetermined maximum angle other than 180°. Multi-section boom 20 further includes a second constant torque assembly that constantly urges second boom 70 to pivot in second direction 72 (see FIG. 7). The second constant torque assembly includes component 80 that is attached to first section 62 of second hinge assembly 60. The second constant torque assembly is discussed in detail in the ensuing description. Second boom 70 further includes an opposite second end to which a scientific instrument 200 may be attached. Scientific instrument 200 is discussed in detail in the ensuing description.

Figure 8:
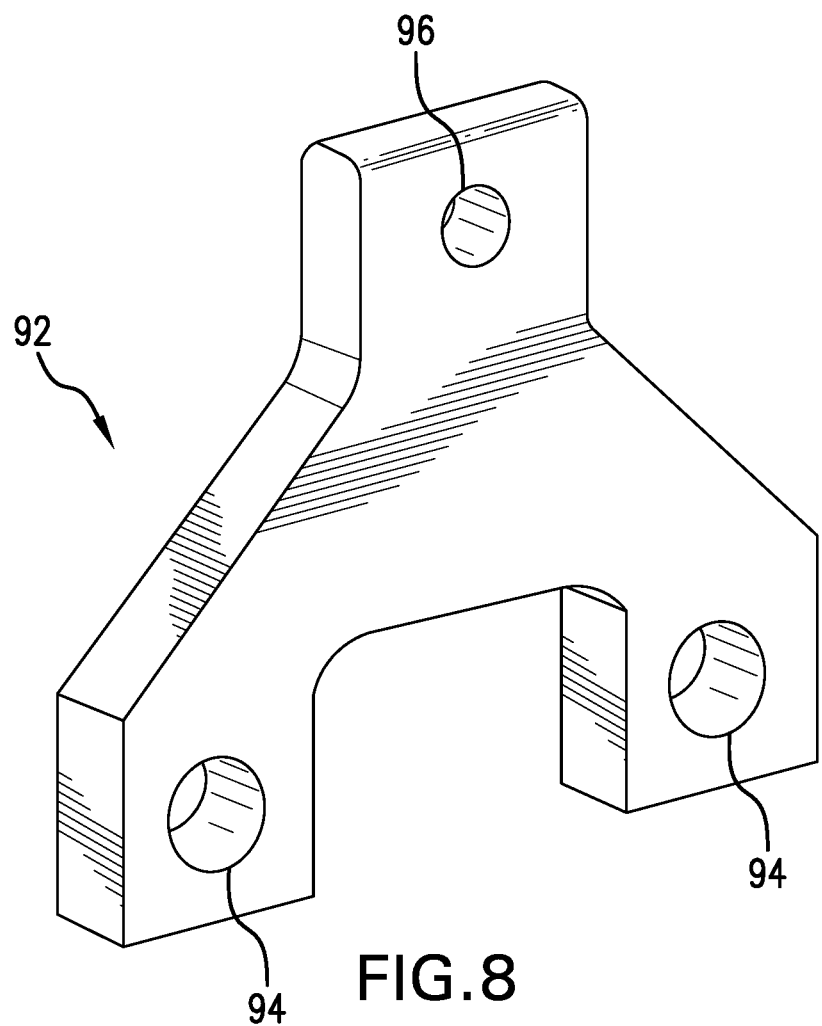
FIG. 8 is a perspective view of a release plate shown in FIGS. 1-5 in accordance with an exemplary embodiment of the invention.
Figure 12:
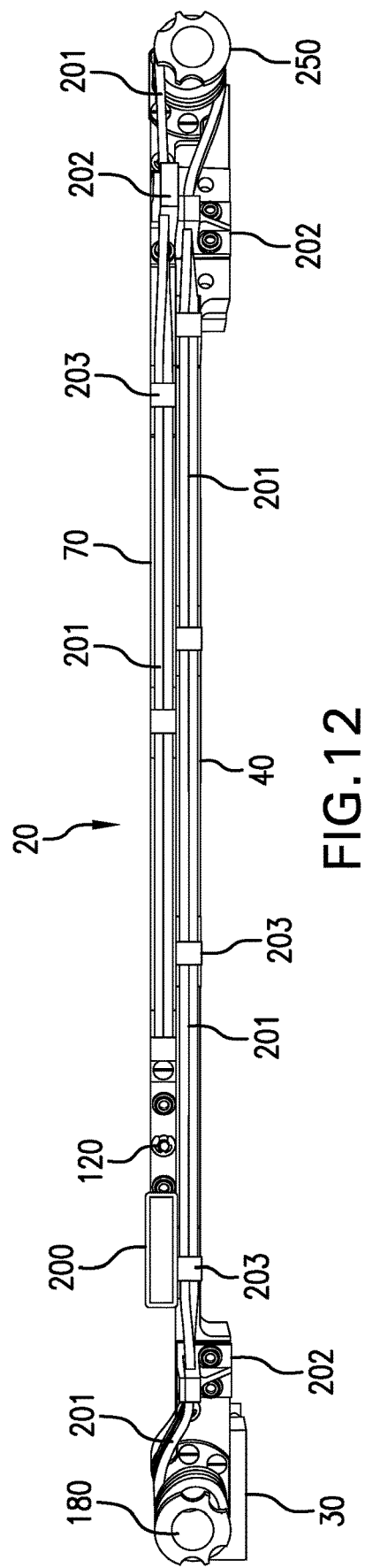
FIG. 12 is a side elevational view of the deployable multi-section boom in the stowed state, the view showing a harness secured to the lower boom and upper boom.
Figure 13:
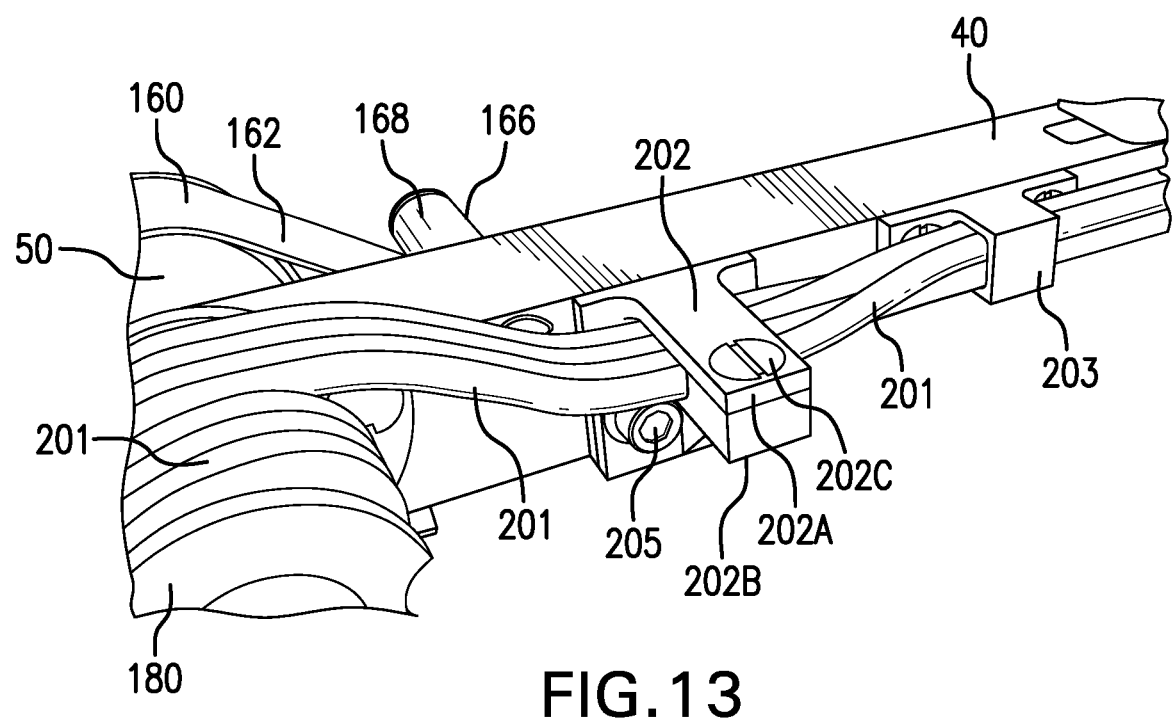
FIG. 13 is an enlarged, perspective view of a portion of the view of FIG. 12.

Referring to FIGS. 1, 2 and 7-11, spacecraft body 24 includes release mechanism 90 that is operable with release plate 92. Release mechanism 90 is shown in phantom in FIGS. 1-5. In an exemplary embodiment, release mechanism 90 and release plate 92 are configured as the release mechanism and release block, respectively, that are shown in FIGS. 13 and 12B of U.S. Pat. No. 9,546,008, entitled "Miniature Release Mechanism Or Diminutive Assembly For Nanosatellite Deployables (DANY)", the disclosure of which patent is incorporated herein by reference. However, it is to be understood that release mechanism 90 and release plate 92 may be realized by other suitable devices. Release mechanism 90 is configurable in a first state wherein release mechanism 90 retains release plate 92 and in a second state wherein release mechanism 90 releases the release plate 92. As shown in FIG. 8, release plate 92 includes two passages 94 for receiving corresponding pins of release mechanism 90. When the corresponding pins of release mechanism 90 are inserted into passages 94, the release plate 92 is secured to release mechanism 90. In an exemplary embodiment, release plate 92 includes passage 96 oriented in the same direction as passages 94. Passage 96 is sized to receive a corresponding pin 120 positioned within slot 122 in upper boom 70 (see FIGS. 5 and 12). When multi-section boom 20 is in the stowed state, as shown in FIG. 1, second boom 70 is in juxtaposition to first boom 40 such that release plate 92, while still secured to release mechanism 90, extends through slot 42 of first boom 40 and into slot 122 of second boom 70 such that pin 120 passes through passage 96. Thus, when multi-section boom 20 is in the stowed position, corresponding pins of release mechanism 90 pass through passages 94 of release plate 92 and pin 120 in upper boom 70 passes through passage 96 of release plate 92. As shown in FIG. 7, extending portion 150 that extends a predetermined distance beyond first section 62 of second hinge assembly 60. Spacecraft body 24 includes retainer or lip 152 that engages extending portion 150 so as to maintain multi-section boom 20 in the stowed state as shown in FIG. 1. Lip 152 passively restrains second hinge assembly 60 without the need of additional release mechanisms. When release mechanism 90 is activated, the pins (not shown) of release mechanism 90 are withdrawn from passages 94 thereby releasing the release plate 92 from release mechanism 90. Once release plate 92 is released, the torque created by the second constant torque assembly causes second boom 70 to pivot in the second direction 72. As second boom 70 pivots in the second direction 72, extending portion 150 becomes disengaged or free from lip 152. When extending portion 150 is free of lip 152, the torque created by the first constant torque assembly causes first boom 40, and thus the entire multi-section boom 20, to pivot in first direction 44 while second boom 70 simultaneously pivots in second direction 72 with respect to first boom 40. Multi-section boom 20 is fully deployed when first boom 40 pivots to the first predetermined maximum angle and second boom 70 pivots to the second predetermined maximum angle. In an exemplary embodiment, the first predetermined maximum angle is 180° and the second predetermined maximum angle is 180°. In order to stow multi-section boom 20, first boom 40 must first be pivoted back toward spacecraft body 24 in order to close first hinge assembly 30 and thereafter, second boom 70 is pivoted toward first boom 40 until extending portion 150 is engaged by lip 152 and second boom 70 is in juxtaposition with first boom 40 as shown in FIG. 1 such that release plate 92 is inserted into slot 42 and back into release mechanism 92. Release mechanism 92 may have to be reconfigured, reset or replaced prior to the re-stowage of deployable multi-section boom 20. In an alternate embodiment, deployable multi-section boom 20 is configured for a one-time deployment such that when multi-section boom 20 is deployed, it remains deployed and does not return to the stowed state.

In another embodiment, release plate 92 is rigidly attached to second boom 70. In such an embodiment, second boom 70 is configured without pin 120 and slot 122. In this embodiment, the release plate 92 still operates with release mechanism 90 as described in the foregoing description.

Figure 9:
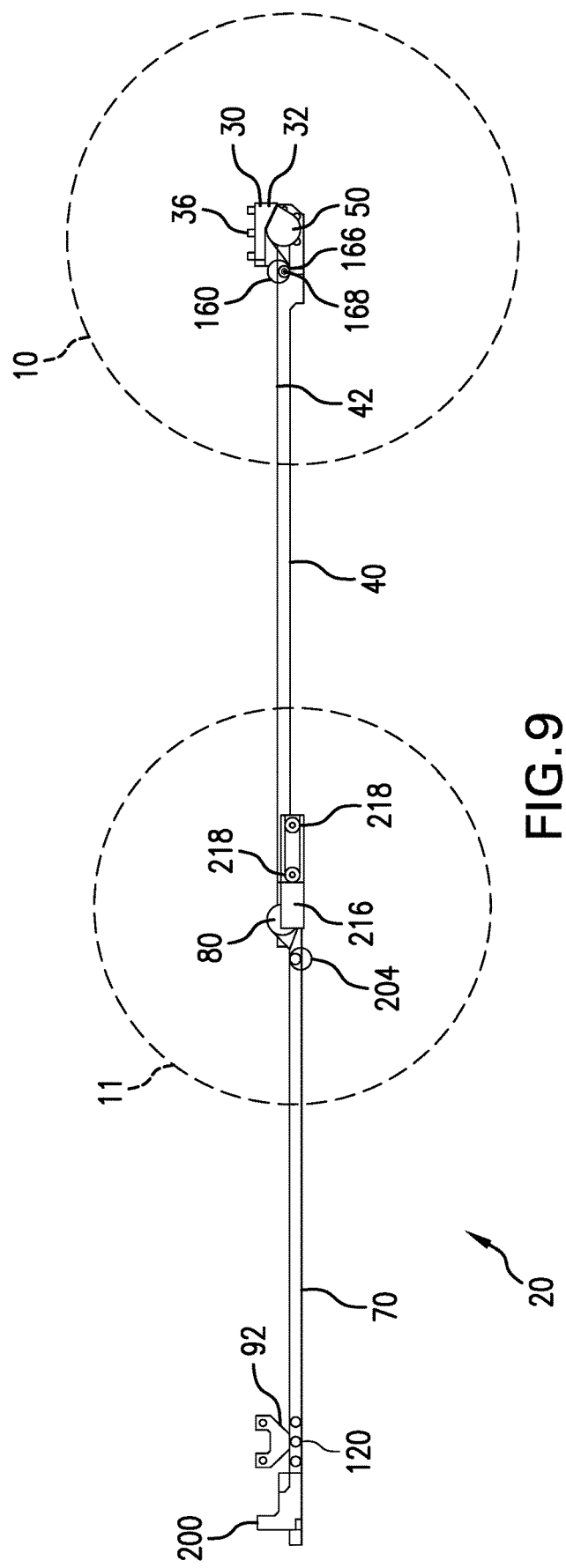
FIG. 9 is another side-elevational view of the deployable multi-section boom in the fully deployed state.
Figure 10:
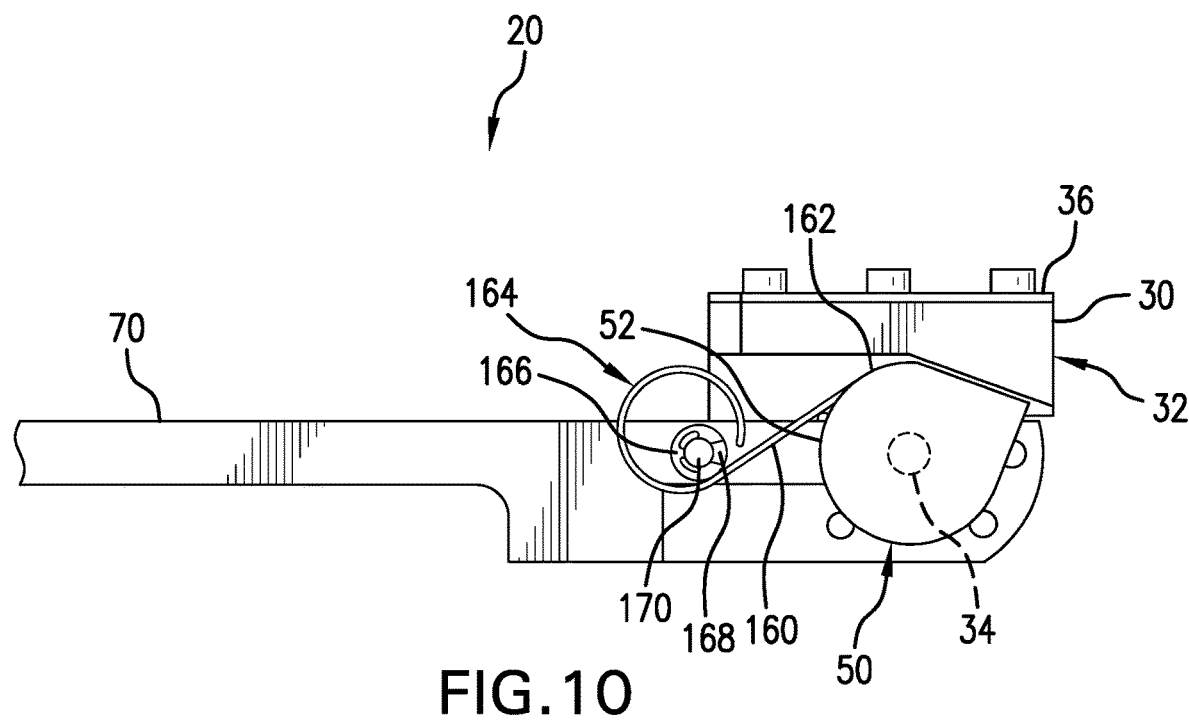
FIG. 10 is an enlarged view of a portion of the view of FIG. 9, the view showing the first constant torque assembly and a portion of the first hinge assembly.

As shown in FIGS. 3-6, the first constant torque assembly constantly urges first boom 40 to pivot in the first direction 44. The first constant torque assembly includes component 50 that is attached to base section 32 of first hinge assembly 30. Component 50 comprises a spool or drum that has a substantially cylindrical shape, a circumference and exterior surface 52 that extends about the circumference. Spool 50 includes a longitudinally extending axis and an internal bore or passage (not shown) that extends in the same direction as the longitudinally extending axis of spool 50. The bore is sized for receiving a portion of hinge shaft 34 (see FIG. 1) such that spool 50 supports this portion of hinge shaft 34. In an exemplary embodiment, the bore of spool 50 is substantially coaxial with the longitudinally extending axis of spool 50. Hinge shaft 34 is shown in phantom in FIG. 10. In an exemplary embodiment, spool 50 is rigidly fixed to base section 32 of first hinge assembly 30. The first constant torque assembly further includes constant torque spring 160 which has a first portion 162 thereof wrapped about at least a portion of exterior surface 52 of spool 50 and second portion 164 that extends in a direction that is tangential to the circumference of spool 50. In an exemplary embodiment, constant torque spring 160 is a multi-layered constant spring which allows for easy addition or subtraction of overall torque by adding or removing spring leaves. In another embodiment, constant torque spring 160 is configured as a bi-stable tape spring. The first constant torque assembly further includes roller assembly 166 which has roller member 168 which is rotatably attached to first boom 40 and in an abutting relationship with second portion 164 of constant torque spring 160 such that constant torque spring 160 exerts a constant force on roller member 168 so as to urge first boom 40 to pivot in first direction 44 with respect to base section 32. As first boom 40 pivots in first direction 44, roller member 168 rolls over second portion 164 of constant torque spring 160. Roller assembly 166 further includes shaft 170 that is mounted or attached to first boom 40. Roller member 168 rotates about the shaft 170. Clip 172 retains shaft 170 on first boom 40. A second clip (not shown) that is similar to clip 172 is used to retain roller member 168 on shaft 170. As shown in FIGS. 9 and 10, second portion 164 curls about roller member 168 as first boom 40 pivots in first direction 44.

Referring to FIG. 6, multi-section boom 20 further includes harness drum 180 attached to first boom 40 for supporting a portion of hinge shaft 34 and is positioned such that first boom 40 is between spool 50 and harness drum 180. In an exemplary embodiment, screws 181 are used to attach harness drum 180 to first boom 40. However, other suitable fastener means, devices or techniques may be used to attach harness drum 180 to lower boom 40. In an exemplary embodiment, harness drum 180 is substantially cylindrical in shape and has a longitudinally extending axis that is substantially coaxial with hinge shaft 34. Harness drum 180 includes an internal bore or passage (not shown) that is sized for receiving a portion of hinge shaft 34. In an exemplary embodiment, the bore in harness drum 180 is substantially coaxial with the longitudinally extending axis of harness drum 180. Referring to FIGS. 12 and 13, the cylindrical shape of harness drum 180 allows harness 201 to be secured to harness drum 180. Harness 201 is wrapped or looped around harness drum 180 in a single loop. Harness 201 is further discussed in the ensuing description. FIGS. 1-5 do not show harness drum 180 in order to simplify the views for the purpose of facilitating understanding of the invention.

Figure 11:
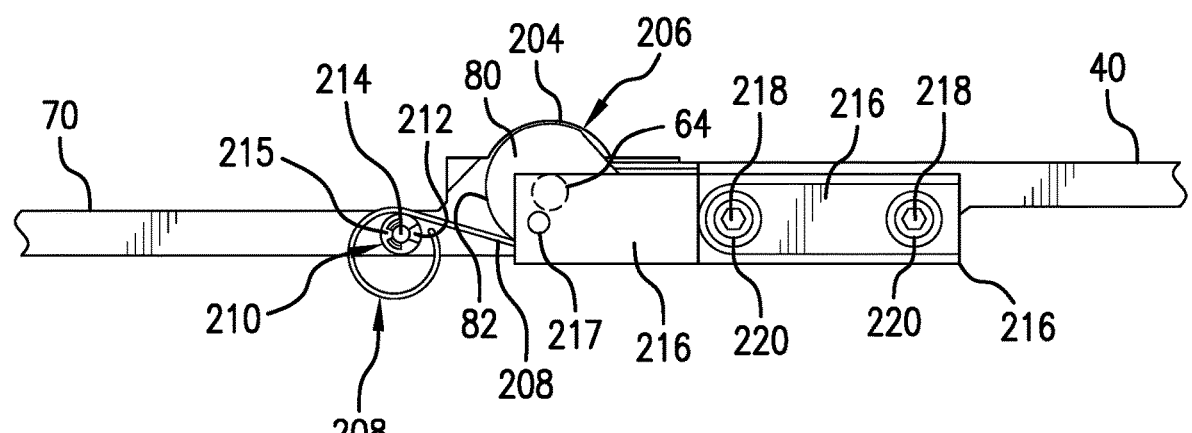
FIG. 11 is an enlarged view of a portion of the view of FIG. 9, the view showing the second constant torque assembly and a portion of the second hinge assembly.

Referring to FIGS. 7, 9 and 11, the second constant torque assembly includes component 80 that is attached to first section 62 of second hinge device 60. In an exemplary embodiment, component 80 comprises a spool or drum that has a substantially cylindrical shape, a circumference and exterior surface 82 that extends about the circumference of spool 80. Spool 80 includes a longitudinally extending axis and an internal bore or passage (not shown) that extends in the same direction as the longitudinally extending axis of the spool 80. The bore of spool 80 is sized for receiving a portion of second hinge shaft 64 so as to allow spool 80 to support that portion of second hinge shaft 64. In FIG. 11, second hinge shaft 64 is shown in phantom. In an exemplary embodiment, the bore of spool 80 is substantially coaxial with the longitudinally extending axis of spool 80. The second constant torque assembly includes second constant torque spring 204. In an exemplary embodiment, constant torque spring 204 is a multi-layered constant spring which allows for easy addition or subtraction of overall torque by adding or removing spring leaves. In another embodiment, constant torque spring 204 is configured as a bi-stable tape spring. Second constant torque spring 204 includes first portion 206 that is wrapped about at least a portion of exterior surface 82 of spool 80 and second portion 208 that extends in a direction that is tangential to the circumference of spool 80. The second constant torque assembly further includes roller assembly 210 which includes roller member 212. Roller member 212 is rotatably attached or secured to second boom 70. Roller member 212 is in an abutting relationship with second portion 208 of second constant torque spring 204 such that second constant torque spring 204 exerts a constant force or torque on roller member 212 so as to urge second boom 70 to pivot in second direction 72 with respect to first boom 40. As second boom 70 pivots in second direction 72, roller member 212 rolls over second portion 208 of second constant torque spring 204 as shown in FIG. 11. Roller assembly 210 further includes shaft 214 that is attached or secured to second boom 70. Roller member 212 rotates about shaft 214. Clip 215 retains roller member 212 on shaft 214. Another clip (not shown) that is similar to clip 215 is used to retain shaft 214 on upper boom 70. The second constant torque device further includes torque spring adapter 216 that is attached to first boom 40. Torque spring adapter 216 holds spool 80 and constant torque spring 204 in place. In an exemplary embodiment, one or more screws 217 are used to attach torque spring adapter 216 to spool 80. In an exemplary embodiment, screws 218 and washers 220 are used to attach torque spring adapter 216 to lower boom 40. However, it is to be understood that other techniques and/or fasteners may be used to attach torque spring adapter 216 to lower boom 40, e.g. rivets, welding, brazing, etc. As shown in FIG. 11, second portion 208 of constant torque spring 204 curls about roller member 212 as second boom 70 pivots in second direction 72 to the second predetermined maximum angle.

Figure 14:
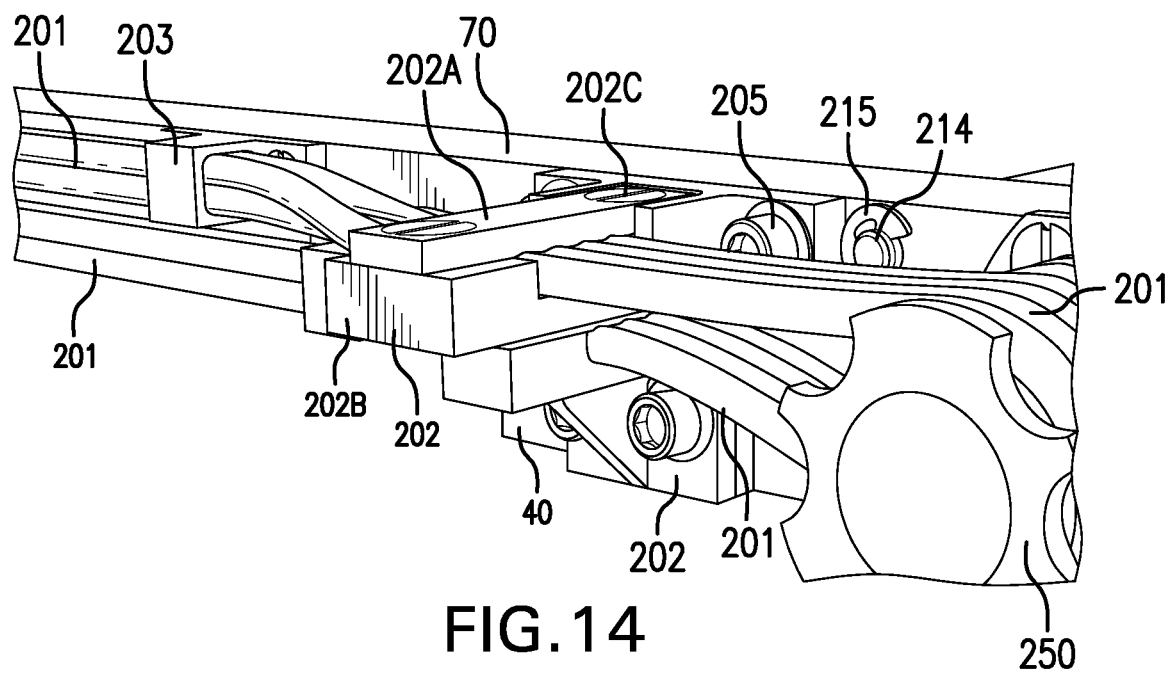
FIG. 14 is an enlarged, perspective view of another portion of the view of FIG. 12.

Referring to FIG. 7, multi-section boom 20 further includes harness drum 250 that is attached to second boom 70 for supporting a portion of second hinge shaft 64 and positioned such that second boom 70 is between spool 80 and harness drum 250. In an exemplary embodiment, harness drum 250 is attached to second boom 70 via screws (not shown). However, it is to be understood that other suitable techniques and/or fasteners may be used to attach harness drum 250 to second boom 70. In an exemplary embodiment, harness drum 250 is substantially cylindrical in shape and has a longitudinally extending axis that is substantially coaxial with second hinge shaft 64. Harness drum 250 includes an internal bore or passage (not shown) that is sized for receiving a portion of hinge shaft 64. In an exemplary embodiment, the bore of harness drum 250 is substantially coaxial with the longitudinally extending axis of harness drum 250. The cylindrical shape of harness drum 250 allows harness 201 to be secured to harness drum 250. As shown in FIGS. 12 and 14, harness 201 is wrapped or looped around harness drum 250 in a single loop. Harness 201 is further discussed in the ensuing description. For purposes of simplifying the view of FIG. 12, structure 22, release mechanism 90 and release plate 92 are not shown.

Harness 201 houses electrical wires that are in electrical signal communication with scientific instrument 200 that is attached to the opposite second end of second boom 70 as shown in FIGS. 1-5 and 12. Instrument 200 may be any one of a variety of instruments including a 3-axis magnetometer, temperature sensor, thermistor, probe, camera, radiation detector, etc. If a 3-axis magnetometer is attached to multi-section boom 20, then preferably the 3-axis magnetometer includes thermal tape to maintain healthy temperatures on-orbit. Referring to FIGS. 12-14, harness 201 is wrapped about each harness drum 180 and 250 in a single loop to provide strain relief, minimize the torque required to overcome the forces produced by bending harness 201 and to provide a flexible joint. Such a configuration minimizes restrictive forces especially within cold environments. Harness 201 is also secured to first boom 40 and second boom 70 by clamp members 202 and harness guides 203 that are attached to the sides of first boom 40 and second boom 70. Clamp members 202 provide further strain relief for harness 201. Each clamp member 202 includes first section 202A, second section 202B and screw or fastener 202C which attaches first section 202A and second section 202B together. Harness 201 is clamped between first section 202A and 202B. Clamp members 202 and harness guides 203 may be attached to the sides of first boom 40 and second boom 70 by screws 205 or any other suitable fasteners or techniques, e.g. bolts, rivets, welding, brazing, etc.

In an exemplary embodiment, multi-section boom 20 is configured to have a length that is over 50 centimeters when multi-section boom 20 is fully deployed. In an exemplary embodiment, multi-section boom 20 has a length of 52 centimeters when multi-section boom 20 is fully deployed. Thus, the miniaturized size of multi-section boom 20 allows it to be used with CubeSats or other miniaturized space craft.

First constant torque spring 160 and second constant torque spring 204 provide a sufficient torque margin during the entire articulation of the deployment of multi-section boom 20 and also provides a strong positive torque at the end for stiffness without needing a positive latch. Thus, constant torque springs 160 and 204 provide sufficient torque to overcome deployment forces with sufficient remaining torque to maintain multi-section boom 20 in a deployed state.

In an exemplary embodiment, constant torque springs 160 and 204 are fabricated from stainless steel and a de-gaussing process is used to remove or minimize magnetic residuals in the stainless steel. All other metallic portions of multi-section boom 20 are preferably fabricated from magnetically clean materials and are chosen from the group including, but not limited to, aluminum, brass, titanium, G10 and phosphorous bronze, ceramics and composite materials. In an exemplary embodiment, the hinge shafts 34 and 64 are made from titanium. In a preferred embodiment, multi-section boom 20 is mostly anodized.

Although the foregoing description is in terms of the deployable multi-section boom being used with spacecraft, it is to be understood that the multi-section boom may be used with other devices including, but not limited to, vehicles, robots including robotic devices used by law-enforcement or military bomb-disposal units and fail-safe laboratory equipment, etc.

The preceding description of the disclosed embodiments is provided to enable any person skilled in the art to make or use the present invention. The embodiments were chosen and described in order to best explain the principles of the invention and its practical applications. Various modifications to these embodiments will readily be apparent to those skilled in the art, and the generic principles defined herein may be applied to other embodiments without departing from the spirit or the scope of the invention. Thus, the present invention is not intended to be limited to the embodiments shown herein but is to be accorded the widest scope consistent with the following claims and the principles and novel features disclosed herein. Any reference to claim elements in the singular, for example, using the articles "a", "an" or "the" is not to be construed as limiting the element to the singular.

What is claimed is:

1. A deployable multi-section boom:
   a first hinge assembly including a base section adapted to be attached to a structure and a movable section that is pivotably attached to the base section;
   a first boom attached to the movable section of the first hinge assembly;
   said first hinge assembly being configured to allow the first boom to pivot in a first direction to a first predetermined maximum angle with respect to the base section;
   a first constant torque assembly for constantly urging the first boom to pivot in the first direction, the first constant torque assembly including a component attached to the base section of the first hinge assembly;
   a second hinge assembly including a first section attached to the first boom and a second section that is pivotably attached to the first section;
   a second boom attached to the second section of the second hinge assembly;
   said second hinge assembly being configured to allow the second boom to pivot in a second direction to a second predetermined maximum angle with respect to the first boom;
   a second constant torque assembly for constantly urging the second boom to pivot in the second direction, the second constant torque assembly including a component that is attached to the first section of the second hinge assembly; and
   said first constant torque assembly and second constant torque assembly cooperating to configure the deployable multi-section boom in a fully deployed state, wherein the constant torque applied to the first boom causes the entire multi-section boom to pivot in the first direction while the constant torque applied to the second boom causes the second boom to pivot simultaneously in the second direction with respect to the first boom while the entire multi-section boom continues to pivot in the first direction and wherein the multi-section boom is fully deployed when the first boom pivots to the first predetermined maximum angle and the second boom pivots to the second predetermined angle.

2. The deployable multi-section boom according to claim 1 wherein the first predetermined maximum angle is about 180°.

3. The deployable multi-section boom according to claim 1 wherein the second predetermined maximum angle is about 180°.

4. The deployable multi-section boom according to claim 1 wherein the first predetermined maximum angle is about 180° and the second predetermined maximum angle is about 180°.

5. The deployable multi-section boom according to claim 1 wherein the movable section of the first hinge assembly comprises a hinge shaft.

6. The deployable multi-section boom according to claim 5 wherein said component of the first constant torque assembly comprises a spool having a substantially cylindrical shape, a circumference and an exterior surface that extends about the circumference, the spool including a longitudinally extending axis and an internal bore that extends in the same direction as the longitudinally extending axis, wherein the passage is sized for receiving a portion of the hinge shaft such that the spool supports said portion of the hinge shaft.

7. The deployable multi-section boom according to claim 6 wherein the longitudinally extending axis of the spool is substantially coaxial with the hinge shaft.

8. The deployable multi-section boom according to claim 6 wherein the first constant torque assembly includes a constant torque spring having a first portion thereof wrapped about at least a portion of the exterior surface of the spool and a second portion that extends in a direction that is tangential to the circumference of the spool.

9. The deployable multi-section boom according to claim 8 wherein the first constant torque assembly further includes a roller assembly having a roller member that is rotatably attached to the first boom and in an abutting relationship with the second portion of the constant torque spring such that the constant torque spring exerts a constant force or torque on the roller member so as to urge the first boom to pivot in a first direction with respect to the base section of the first hinge device, wherein as the first boom pivots in the first direction, the roller member rolls over the second portion of the constant torque spring.

10. The deployable multi-section boom according to claim 9 wherein the roller assembly further includes a shaft that is attached to the first boom and wherein the roller member rotates about the shaft.

11. The deployable multi-section boom according to claim 6 further comprising a drum attached to the first boom for supporting a portion of the hinge shaft, wherein the first boom is between the spool and the drum.

12. The deployable multi-section boom according to claim 11 wherein the drum is substantially cylindrical in shape and has a longitudinally extending axis that is substantially coaxial with the hinge shaft.

13. The deployable multi-section boom according to claim 1 further comprising an isolator attached to the base section of the first hinge assembly such that the isolator is positioned between the base section and a structure to which the base section is attached.

14. The deployable multi-section boom according to claim 1 wherein the second section of the second hinge assembly comprises a hinge shaft.

15. The deployable multi-section boom according to claim 14 wherein said component of the second constant torque assembly comprises a spool having a substantially cylindrical shape, a circumference and an exterior surface that extends about the circumference, the spool including a longitudinally extending axis and an internal bore that extends in the same direction as the longitudinally extending axis, wherein the internal bore is sized for receiving a portion of the hinge shaft such that the spool supports said portion of the hinge shaft.

16. The deployable multi-section boom according to claim 15 wherein the internal bore of the spool is substantially coaxial with the longitudinally extending axis of the spool.

17. The deployable multi-section boom according to claim 15 wherein the second constant torque assembly includes a second constant torque spring having a first portion thereof wrapped about at least a portion of the exterior surface of the spool and a second portion that extends in a direction that is tangential to the circumference of the spool.

18. The deployable multi-section boom according to claim 17 wherein the second constant torque assembly further includes a roller assembly having a roller member that is rotatably attached to the second boom and in an abutting relationship with the second portion of the second constant torque spring such that the second constant torque spring exerts a constant force or torque on the roller member so as to urge the second boom to pivot in the second direction with respect to the first boom, wherein as the second boom pivots in the second direction, the roller member rolls over the second portion of the constant torque spring.

19. The deployable multi-section boom according to claim 18 wherein the roller assembly further includes a shaft that is attached to the second boom and wherein the roller member rotates about the shaft.

20. The deployable multi-section boom according to claim 15 further comprising a drum attached to the second boom for supporting a portion of the second hinge shaft, wherein the second boom is between the spool and the drum.

21. The deployable multi-section boom according to claim 20 further wherein the drum is substantially cylindrical in shape and has a longitudinally extending axis that is substantially coaxial with the hinge shaft.

22. The deployable multi-section boom according to claim 1 wherein the base section of the first hinge assembly is configured to physically contact a portion of the first boom so as to limit the pivotal movement of the first boom at a first predetermined angle.

23. The deployable multi-section boom according to claim 1 wherein the second boom includes a portion that is configured to physically contact a portion of the first boom so as to limit the pivotal movement of the second boom at a second predetermined angle.

24. The deployable multi-section boom according to claim 1 wherein the first boom includes a through-hole sized to allow passage there-through of at least a portion of a release plate.

25. The deployable multi-section boom according to claim 24 wherein the second boom is configured to engage said at least a portion of the release plate.

26. The deployable multi-section boom according to claim 1 wherein the second boom has a first end attached to the second section of the second hinge assembly and an opposite second end, the opposite second end being configured to allow a scientific instrument to be attached to the opposite second end.

27. The deployable multi-section boom according to claim 26 further including a scientific instrument attached to the opposite second end of the second boom.

28. The deployable multi-section boom according to claim 26 further including cable harnesses secured to the first boom and second boom, the cable harnesses having therein electrical wires adapted for electrical connection to a scientific instrument.

29. The deployable multi-section boom according to claim 26 further comprising means for securing cable harnesses to the first boom and second boom.

30. A spacecraft comprising:
a spacecraft body;
a deployable multi-section boom movable attached to the spacecraft body and configurable to a fully deployed state from an initial stowed state;
a first hinge assembly including a base section adapted to be attached to the spacecraft body and a movable section that is pivotably attached to the base section;

a first boom attached to the movable section of the first hinge assembly;

said first hinge assembly being configured to allow the first boom to pivot in a first direction to a first predetermined maximum angle with respect to the base section;

a first constant torque assembly for constantly urging the first boom to pivot in the first direction, the first constant torque assembly including a component attached to the base section of the first hinge assembly;

a second hinge assembly including a first section attached to the first boom and a second section that is pivotably attached to the first section;

a second boom attached to the second section of the second hinge assembly;

said second hinge assembly being configured to allow the second boom to pivot in second direction to a second predetermined maximum angle with respect to the first boom;

a second constant torque assembly for constantly urging the second boom to pivot in the second direction, the second constant torque assembly including a component that is attached to the first section of the second hinge assembly;

a release mechanism attached to the spacecraft body, the release mechanism including a release plate releasably attached thereto, the release mechanism being configurable to a first state wherein the release mechanism retains the release plate and a second state when the release mechanism releases the release plate, the release plate being configured for engagement with the second boom so to prevent pivotal movement of the second boom, wherein then the multi-section boom is in the stowed state, the second boom is in juxtaposition with the first boom and the release plate is engaged with the second boom;

a lip attached to the spacecraft body for engaging a portion of the second boom in order to maintain the multi-section boom in the stowed state; and whereby when the release mechanism is configured to the second state, the release plate is released thereby allowing the second constant torque assembly to cause the second boom to pivot in the second direction with respect to the first boom so the portion of the second boom becomes disengaged from the lip thereby allowing the first constant torque assembly to cause the first boom, and thus the entire multi-section boom, to simultaneously pivot in the first direction while the second boom continues to pivot in the second direction, the multi-section boom being fully deployed when the first boom pivots to the first predetermined maximum angle and the second boom pivots to the second predetermined maximum angle.

\* \* \* \* \*